(12) United States Patent
Ziemkowski et al.

(10) Patent No.: US 6,479,962 B2
(45) Date of Patent: Nov. 12, 2002

(54) IN-DEVICE CHARGING SYSTEM AND METHOD FOR MULTI-CHEMISTRY BATTERY SYSTEMS

(75) Inventors: Ted B Ziemkowski, Loveland, CO (US); Heather N Bean, Fort Collins, CO (US); Mark J Bianchi, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/811,174

(22) Filed: Mar. 16, 2001

(65) Prior Publication Data

US 2002/0130634 A1 Sep. 19, 2002

(51) Int. Cl.$^7$ ................................................ H02V 7/00
(52) U.S. Cl. ........................................................ 320/106
(58) Field of Search ................................ 320/162, 106, 320/163

(56) References Cited

U.S. PATENT DOCUMENTS

| | | | | |
|---|---|---|---|---|
| 4,577,144 A | * | 3/1986 | Hodgman et al. | 320/106 |
| 5,796,239 A | * | 8/1998 | van Phuoc et al. | 320/107 |
| 5,804,944 A | * | 9/1998 | Alberkrack et al. | 320/163 |
| 6,043,625 A | * | 3/2000 | Dowe | 320/106 |
| 6,215,275 B1 | * | 4/2001 | Bean | 320/106 |
| 6,236,186 B1 | * | 5/2001 | Helton et al. | 320/106 |

* cited by examiner

Primary Examiner—Gregory J. Toatley, Jr.

(57) ABSTRACT

A battery management system and method for an electronic device that may be powered by an AC source (using an AC adapter), or by a battery. The battery management system includes firmware configured to determine whether a battery coupled to the electronic device is rechargeable. The firmware is also coupled to and configured to control a charge switch. When the battery and an AC source are both coupled to the device, activating the charge switch causes a charging current to be applied from the AC source to the battery. The charge switch and firmware are configured to cause the charging current to not be applied to the battery if it is determined that the battery is not rechargeable.

21 Claims, 4 Drawing Sheets

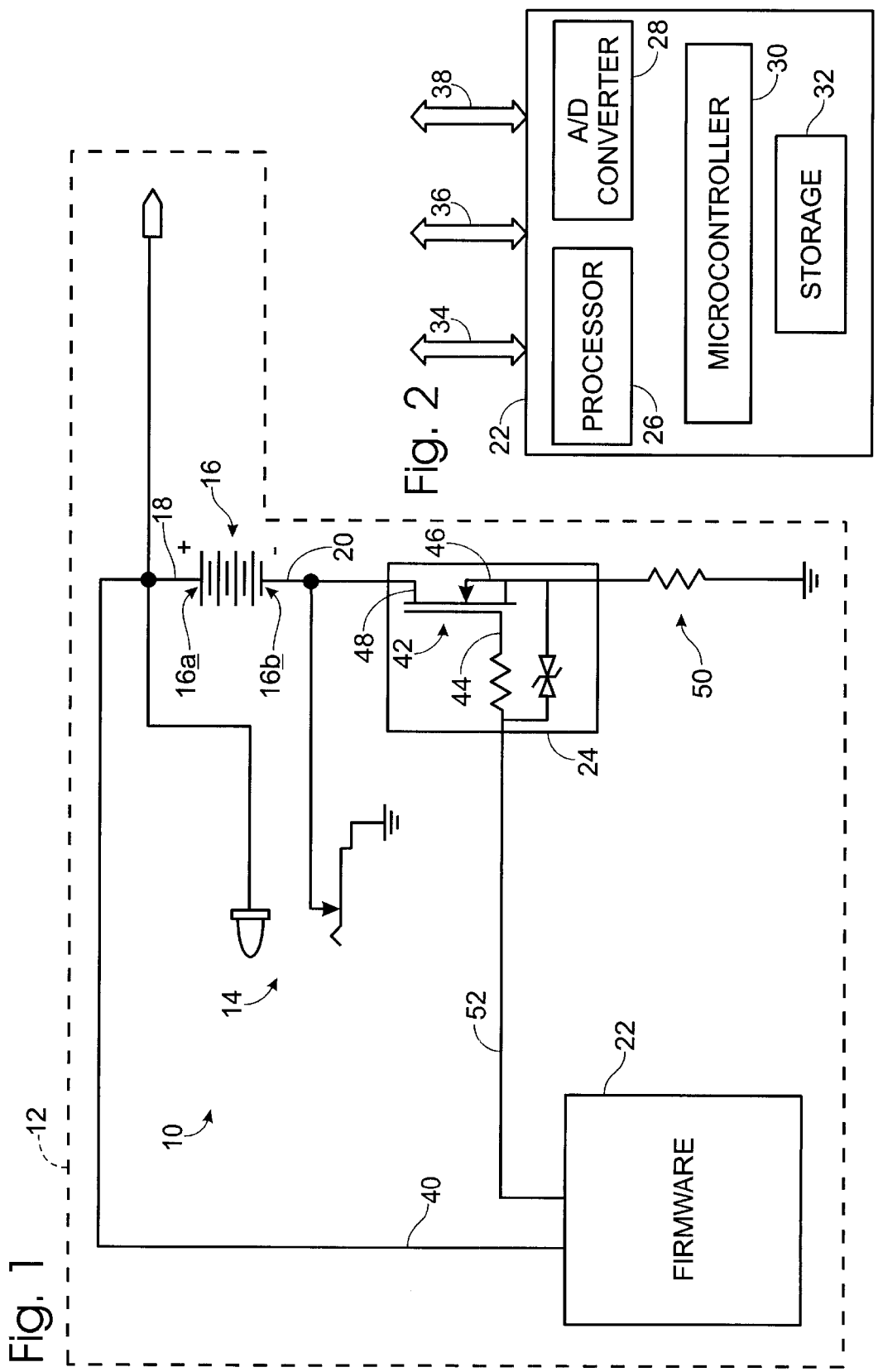

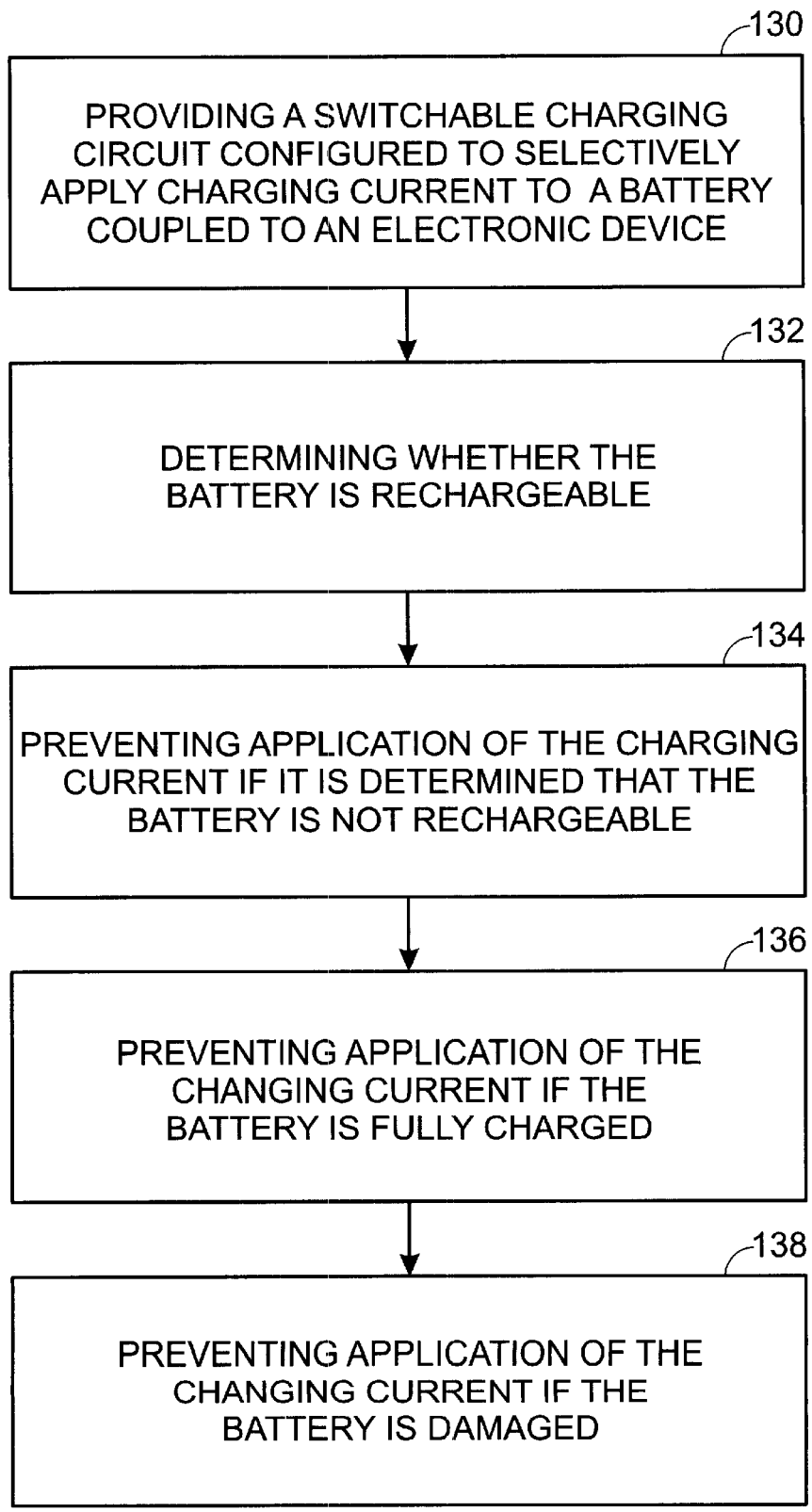

IN-DEVICE CHARGING SYSTEM AND METHOD FOR MULTI-CHEMISTRY BATTERY SYSTEMS

FIELD OF THE INVENTION

The invention is related generally to power systems for electronic devices that allow the device to be variously powered by an AC source or by non-rechargeable or rechargeable batteries. More particularly, the invention relates to battery management systems and methods adapted to automatically determine battery type and provide in-device charging.

BACKGROUND OF THE INVENTION

Electronic devices capable of running on battery power or power from an AC source are widely known. Battery chemistries that are commonly used in these devices include alkaline, high-drain alkaline, high-energy lithium, nickel-metal hydride (NiMH) and nickel-cadmium (NiCd). Of these, normally only batteries having NiMH or NiCd chemistries are rechargeable. Attempts to recharge other battery types can lead to venting or leaking of electrochemical materials, and in some cases can result in dangerous explosions. The batteries used in these devices also come in different forms (i.e., sizes), including commonly available forms such AA or AAA. Instead of these conventional forms, specialized battery packs may be employed, as is often the case with rechargeable systems.

AC adapters are widely employed to connect electronic devices to an AC power source. In many existing designs, when the device is connected to an AC source, the battery is either disconnected from the system entirely or is connected in parallel with the converted AC source. The latter is employed when the AC source is used to charge the battery. In either case, it is difficult to accurately monitor the battery. In one case, the battery is completely disconnected, making it impossible to take voltage readings from or otherwise monitor the battery. When the battery is connected in parallel with the AC source, the input from the AC source interferes with monitoring the battery.

As indicated above, some electronic devices are designed to allow recharging of the battery using power supplied via the AC adapter when the device is connected to an AC source. In addition to the problems identified above, many of these designs suffer from various problems associated with the recharging feature. In many designs, an external charger is provided. External chargers can be inconvenient, as they require that the battery be removed from the device and placed in the charger.

Other designs employ rechargeable battery packs having special shapes or sizes. These packs are sometimes recharged in-device, or with an external charger. The unconventional shapes are often selected to prevent attempted recharging of standard-form, non-rechargeable batteries. While often providing adequate protection against recharging non-rechargeable batteries, these designs can be undesirable for many reasons. Specialized packs are typically more expensive to manufacture and replace than conventional batteries. They are often not as readily available as standard-form batteries. Also, use of specialized packs can complicate the design and manufacture of the devices in which they are employed.

Still other devices provide in-device or external charging in connection with standard-form batteries. These devices are intended for use with rechargeable chemistries only (i.e., NiMH or NiCd), and typically are provided with warning labels to that effect. One problem with these devices is that the warning sticker will become worn or fall off, or that the user will simply disregard or fail to notice the warning.

A further problem with many rechargeable systems is that they provide fast-charging, a process which requires applying a relatively high amount of energy to the battery in a short amount of time. This increases the risk of venting, leaking or explosion of the battery, and damage to the device, in the event that recharge is attempted upon a damaged or non-rechargeable battery.

SUMMARY OF THE INVENTION

The present invention provides a battery management system and method for electronic devices that may be powered by an AC source (using an AC adapter), or by a battery. The system includes firmware operatively coupled to the battery, where the firmware is configured to determine whether the battery is rechargeable. The system further includes a charge switch coupled to and controlled by the firmware. When the battery and AC source are coupled to the device, activating the charge switch causes a charging current to be applied from the AC source to the battery. The charge switch and firmware are configured to cause the charging current to not be applied to the battery if it is determined that the battery is not rechargeable.

BRIEF DESCRIPTION OF THE FIGURES

FIG. 1 is a schematic depiction of a battery management system according to the present invention.

FIG. 2 is a schematic depiction of representative firmware which may be used in connection with the battery management systems of the present invention.

FIG. 5 is a flowchart of a battery charging method according to the present invention.

DETAILED DESCRIPTION OF THE INVENTION

Figure 3:
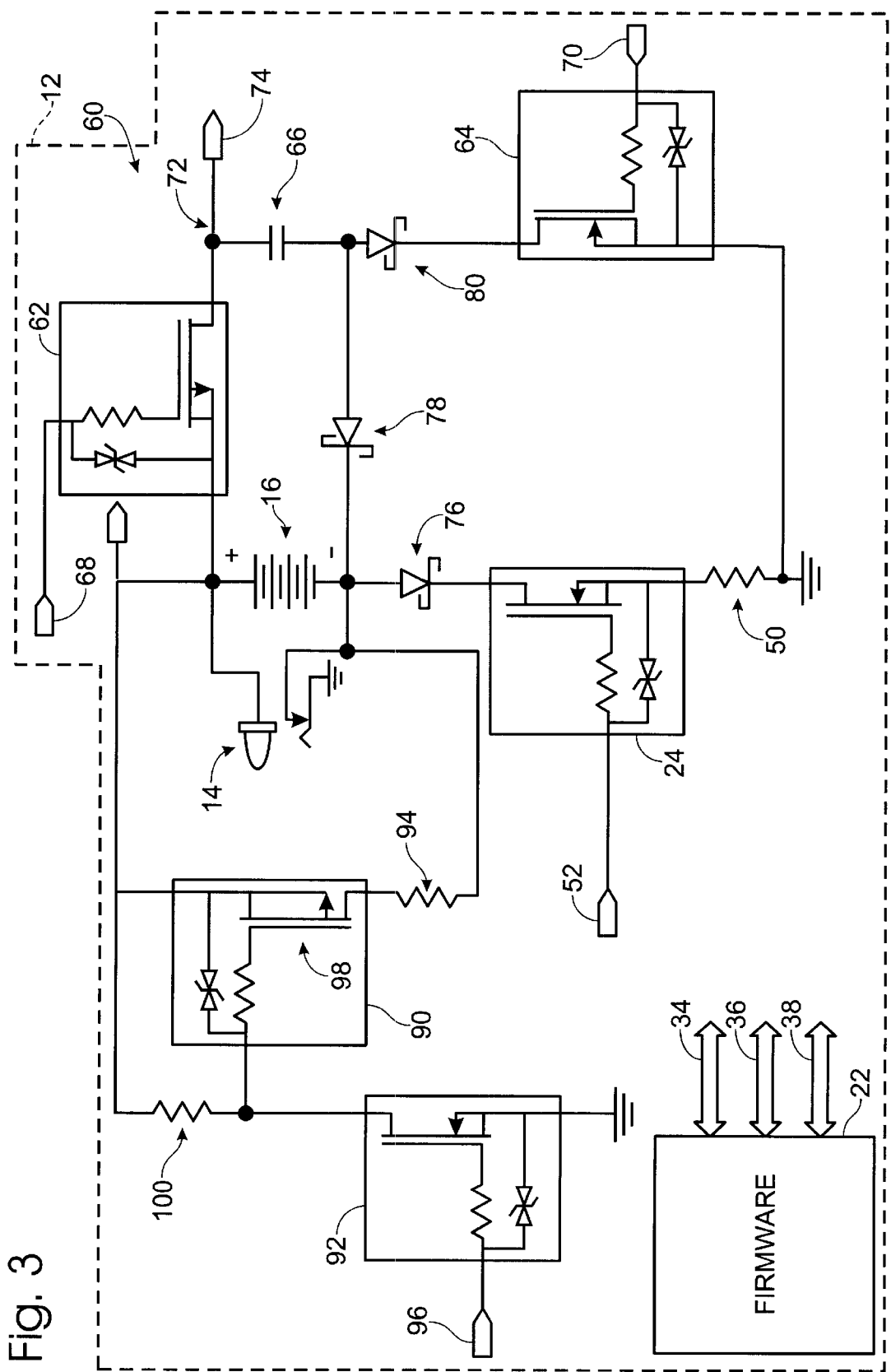
FIG. 3 is a schematic depiction of another battery management system according to the present invention.

FIG. 1 schematically depicts a battery management system 10 according to the present invention, as employed in connection with electronic device 12. System 10 and the other battery management systems of the present invention have proved particularly useful in connection with portable electronic devices such as digital cameras. Accordingly, system 10 and the other embodiments will at times be discussed in that context. It should be appreciated, however, that the present invention is applicable to a wide variety of electronic devices.

Electronic device 12 may be powered by an AC-DC converted power source through AC adapter 14, or by battery 16. Battery 16 may be rechargeable or non-rechargeable and typically is AA, AAA, C, D or another standard form. AC adapter 14 may be implemented as an external unit designed to be plugged into a wall socket, or may be incorporated internally as part of electronic device 12. Electronic device 12 is typically configured so that when the AC adapter is disconnected, the device is automatically powered by battery 16. The AC adapter connections are normally configured so that the negative terminal of the battery is disconnected from ground when an AC source is coupled to the electronic device. Though the invention will be described in the context of a single battery, it should be appreciated that several batteries could be used.

A battery connector having terminal leads 18 and 20 is provided to couple battery 16 to the electronic device. The terminal leads correspond to positive and negative terminals 16a and 16b of the battery. Typically, the battery connector is implemented in connection with a battery compartment located inside the electronic device. The compartment is normally shaped to receive the standard-form batteries mentioned above, i.e., AA, AAA, C, D, etc. Various connections are provided for coupling the battery and battery connector to system 10 and other components of electronic device 12, as will be later explained in more detail.

AC adapter 14 permits use of a converted AC power source when desired to power device 12 and/or recharge battery 16. The AC adapter connections typically are configured so that negative terminal 16b is disconnected from ground when the AC power source is connected to the electronic device. The battery connection may be selectively re-established using a charge switch 24. As will be later explained in detail, re-connecting the battery terminal to ground causes the converted AC source to be connected in parallel with battery 16 via AC adapter 14. This results in application to the battery of a charging current sourced through the AC adapter.

Other components of battery management system 10 include firmware 22 and a charge switch 24 for selectively re-coupling battery 16 to ground when the system is connected to AC power. Firmware 22 may be configured to perform various functions, as will be explained in more detail, including gauging battery level, determining battery chemistry, and enabling/disabling recharging of battery 16.

FIG. 2 is a schematic depiction of firmware 22, showing representative firmware components. As indicated, these components may include a main processor 26, analog-to-digital converter 28, microcontroller 30 and storage 32. Firmware may be coupled to various components of the battery management system and electronic device with control bus 34, monitor bus 36 and system bus 38. The bus connections are named for their functions: control bus 34 carries control signals used to direct the functioning of the battery management system; monitor bus 36 carries signals used to monitor battery 16; and system bus 38 includes various connections between firmware and the other systems of electronic device 12.

The various depicted components of firmware 22 are intended to be illustrative only. It should be appreciated that many different firmware configurations are possible to implement the control and processing functions that will be discussed below. For example, firmware 22 may be implemented as a general purpose computer having a main processor, ROM, RAM, nonvolatile storage, etc. Software especially suited to the processing and control tasks discussed below would be loaded onto the computing device and appropriately executed. Another alternative is to provide a single specialty device, perhaps a single chip, in which necessary software and hardware is embedded.

Because it is preferred that electronic device 12 be compatible with both non-rechargeable and rechargeable batteries, it is important that management system 10 be able to distinguish battery types of different chemistries. This function typically is automated and performed in large part by firmware 22. Firmware 22 may thus be thought of as including a chemistry identifier.

Chemistry identification may be performed by firmware 22 according to the methodology disclosed in U.S. patent application Ser. No. 09/430,334, filed Oct. 29, 1999 entitled "A Method for the Automatic Determination of Battery Chemistry in Portable Electronic Devices," which is now U.S. Pat. No. 6,215,275 B1 the disclosure of which is incorporated herein by this reference. The method generally involves measuring the voltage across the battery terminals when the battery is subjected to a relatively low load and then measuring the terminal voltage when a relatively high load is placed across the battery. It has been found that the ratio of these two values varies predictably among commonly-employed battery chemistries, allowing rechargeable and non-rechargeable batteries to be readily distinguished. Battery voltages typically are read by firmware 22 via line 40, which may be included as part of monitor bus 36 (FIG. 2).

The relative low and high loads used to determine battery chemistry may be provided by special test loads or by the various systems of electronic device 12. Where test loads are used, two known reference resistances are employed: one to simulate an open circuit (low load) across the battery, and another to simulate a short-circuit (high load). Simple switching and logic circuitry, as is well known in the electronic arts, may be employed to successively apply the low and high loads across the battery terminals. The use of known reference loads for chemistry identification and other purposes will be discussed in further detail with reference to FIGS. 3 and 4.

Instead of known reference loads, the varying load posed by electronic device 12 may be used to perform chemistry identification. The load posed by device 12 will be high when the device performs certain tasks, and relatively low at other times. In a digital camera, for example, moving the camera lens with a motorized drive is a power-intensive task that poses a high load on the power source. At other times, for example when waiting for user input in standby mode, the camera poses a much lower load. The terminal voltage of the battery can be measured at these different times and compared to perform chemistry identification. Firmware 22 may be configured to control the timing and performance of these measurements, based upon the operational status of the electronic device at a given time. Typically, the operational status of device 12 is determined through signals carried on system bus 38.

The chemistry identification typically plays a role in the operation of charge switch 24, which is controlled by firmware 22 to enable and disable charging of battery 16. Charge switch 24 includes an N-type enhancement field-effect transistor 42 (FET) coupled between negative battery terminal 16b and ground. As is well known in the electrical arts, FETs are semiconductor devices having three terminals, a gate, a source and a drain. In the depicted FET configuration, the voltage existing at gate terminal 44 and source terminal 46 determines the degree to which current is allowed to flow between drain terminal 48 and source terminal 46.

When the conductive channel between source 46 and drain 48 is open, charging current sourced through AC adapter 14 is applied to the battery, causing it to be recharged. The charging current is held to a fairly low level through use of a relatively large resistor 50 coupled to source terminal 46 of the FET. To enable charging, firmware 22 applies an activating signal (typically 3.3 or 5.0 volts) to gate terminal 44 via charge enable line 52, unless: (1) the battery is non-rechargeable; (2) the battery is damaged; or (3) the battery is fully charged. Charge enable line 52 typically is provided as part of control bus 34 (FIG. 2).

Whether or not the battery is rechargeable may be determined according to the method discussed above. The chemistry identification process may also identify damaged batteries, which tend to produce erratic results when tested for chemistry type. To determine whether the battery is fully charged, firmware 22 simply takes periodic voltage readings from the battery, for example using A/D converter 28. In the event that the battery is non-rechargeable, damaged or fully charged, enable line 52 to gate terminal 44 is pulled low to prevent charging current from being applied to the battery.

Charge switch 24 has a self-limiting feature, to limit charging current in the event of a fault condition or other unexpected occurrence. This could result where the input voltage from the AC adapter was unexpectedly high, or where one or more of the installed batteries was damaged. This could also result from chemistry misidentification, or from placing an overly discharged battery in device 12. Charging switch 24 may be configured to automatically turn off in these situations.

The self-limiting feature is based upon certain electrical characteristics of FET 42. A threshold minimum potential difference must exist between gate terminal 44 and source terminal 46, even if the activating signal is applied to the gate, for the transistor to conduct appreciable current between the drain and source. If this potential difference does not exist, the charging current is substantially reduced, e.g., to zero or a negligible amount.

Referring still to FIG. 1, when charge switch 24 is activated to apply a charging current to battery 16, resistor 50 creates a voltage in proportion to the battery charging current. Because the activating signal applied to the gate is fixed, the voltage developed across resistor 50 reduces the potential difference between gate terminal 44 and source 46. The value of resistor 50 and the FET gate threshold voltage of charge switch 24 may be chosen so that under normal charging conditions, the maximum desired charging current will keep charge switch 24 in conduction, but will be nearly enough to trigger the self-limiting feature. If more charging current is demanded (due to some unexpected or fault condition), the increased current will produce an increased voltage across resistor 50, which will in turn reduce the gate to source potential difference. This has the effect of limiting the conducted current in FET 42.

As indicated above, the self-limiting feature provides protection in the event of an unexpectedly high input voltage from AC adapter 14. In this case, the difference between the AC input voltage and the voltage of battery 16 would be higher than expected. This would result in a current through resistor 50 higher than the intended maximum amount, which in turn would produce a voltage at source terminal 46 high enough to automatically turn off FET 42. Similar protection would result if battery 16 were damaged or overly discharged.

The self-limiting and chemistry-based charging features discussed above provide a number of advantages over prior systems. First, the system permits use of either rechargeable or non-rechargeable standard form batteries, instead of specialized battery packs, which are often expensive and relatively hard to obtain. The system automatically detects whether the battery may be recharged, and enables/disables charging where appropriate. In the event that charging occurs as a result of some malfunction (e.g., chemistry misidentification), charging currents and voltages are minimized to reduce risks of venting, leaking or explosion. Chemistry identification and charging occur automatically and are transparent to the user. Warning labels advising use of only a particular battery type are unnecessary—the electronic device is operated the same whether rechargeable or non-rechargeable batteries are used. Finally, instead of requiring an external charger, the system offers the convenience and reduced expense of in-device charging.

FIG. 3 depicts another embodiment 60 of a battery management system configured for use with representative electronic device 12. As before, battery 16 is coupled to electronic device 12 via a battery connector having leads corresponding to the positive and negative terminals of the battery. The electronic device may be powered by the battery or with a DC-converted AC source through AC adapter 16. Battery management system 60 may be configured with firmware 22 and charge switch 24, to perform monitoring and charging functions such as those described with reference to FIG. 1. As described with reference to FIG. 2, firmware 22 may be coupled to various other components via control bus 34, monitor bus 36 and system bus 38, to perform various processing, monitoring and control functions.

Battery management system 60 may also be configured with a sample-and-hold capability, to facilitate chemistry identification and fuel gauging of battery 16. In the depicted embodiment, this capability is provided by a sampling subsystem, which may include FET-based switches 62 and 64, and a capacitor 66. For reasons which will become apparent, switches 62 and 64 will be referred to as the "sample switch" and "ground reference switch," respectively. As indicated, sample switch 62 is coupled between the high side of battery 16 and capacitor 66. The sample switch is closed by applying an activating signal (typically 0 volts) via sample line 68, creating a conductive path between the positive terminal of the battery and the high side of capacitor 66. The ground reference switch (i.e., switch 64) is coupled between the negative terminal of the battery and the low side of capacitor 66. The ground reference switch is closed by applying an activating signal (typically 3.3 or 5.0 volts) to ground reference line 70. This closes a conductive path containing the low side terminal of the capacitor and ground. Typically, firmware 22 is configured to control both switches, via signaling through control bus 34.

Closing sample switch 62 samples the voltage of battery 16 and results in storage of the sampled value at circuit node 72. Specifically, closing the sample switch causes capacitor 66 to be charged up by the battery. Ground reference switch 64 is closed during the measurement phase to connect one terminal of capacitor 66 to a reference ground. It will be recalled that coupling the system to AC adapter 14 disconnects the negative terminal of the battery from ground. A reference ground is therefore needed for accurate gauging of battery fuel level. Once the charging of capacitor 66 is completed, the sampled voltage may be read out through battery voltage lead 74, either immediately or at a later time. Typically, firmware 22 reads out battery voltage via monitor bus 36.

Various diodes may be provided to prevent draining of battery 16 and perform other functions relating to the described charging and measurement operations. Specifically, diodes 76 and 80 prevent draining of battery 16 if it has a voltage greater than the DC input voltage. Diodes 78 and 80 provide a return path to the negative terminal of the battery when battery voltage is sampled via sample switch 62. Diodes 76 and 80 also prevent unintentional charging of battery 16 when ground reference switch 64 is turned on.

The ability to sample battery voltage for later readout is one of the chief advantages of the sampling feature. As discussed above, the chemistry identification process involves measuring terminal voltage of the battery when a simulated short circuit (e.g., a relatively high load) is applied across the battery. It so happens that this low load situation occurs in many electronic devices when the device is in a start-up or a stand-by state. For example, when a digital camera on and waiting for user input, most electronic systems are not active.

In the electronic device depicted in FIG. 3, very little system overhead is required to control sample switch 62 and cause the battery voltage to be sampled. Only a low-power digital logic device is needed, for example microcontroller 30 (FIG. 2), to supply a control signal to switch 62. Indeed, the components involved in the sampling and storage functions may be thought of as comprising a passive voltage sampler, since only low-power or passive components (e.g., capacitor 66) are involved.

From the above, it should be appreciated that it is desirable to have all the components of electronic device 12 not directly involved in sampling be inactive or powered down during the sampling process. In a digital camera, for example, the lens drive, main processor (e.g., processor 26) and other power-intensive systems would be shut down or in stand-by mode. This reduces load on the battery to provide a better simulation of the desired open circuit state across the battery.

Optimal open circuit simulation may require that the systems used to read out and process the sampled voltage be inactive during the actual sampling. For example, main processor 26 and storage 32 of representative firmware 22 (FIG. 2) typically will be involved in reading, storing and performing calculations on the sampled voltage. If these systems are active during sampling, however, the load on the battery will be higher, reducing the quality of the open circuit simulation. The capacitor and switches allow sampling and storage of battery voltage while these systems are inactive, while also preserving the sampled value for later readout and processing.

As indicated above, sampling and later readout of battery voltage is useful for simulated open circuit measurement of the battery. At other times, it will be desirable that a higher load be placed across the battery terminals. For example, the chemistry identification process discussed above involves not only an open circuit simulation, but also a short circuit simulation (e.g., a high load applied to the battery). Further, a higher valued load may also aid in gauging fuel level of the battery independent of the chemistry identification process.

Whether the high load state is used for chemistry identification or more generally for fuel gauging, it will often be desirable that the load be a known reference value, to increase the accuracy and reliability of the battery measurements. Accordingly, battery management system 60 may be provided with a reference load subsystem for selectively applying a known load to battery 16. As indicated in FIG. 3, the reference load subsystem may include FET-based switches 90 and 92, which are activated to selectively apply reference load 94 across battery 16. Pulling enable line 96 high activates switching and causes reference load 94 to be applied across the battery. For reasons that will become clear from the following discussion, switches 90 and 92 may be respectively referred to as the "loading switch" and "level-shifting switch."

Loading switch 90 performs the actual enabling and disabling of reference load 94. When FET 98 is turned on, reference load 94 is coupled across the battery. Reference load 94 typically is a five ohm resistor, but may have any value providing a suitable reference.

Level-shifting switch 92 provides level shifting to ensure proper operation of loading switch 90. Level-shifting switch 92 is coupled to the gate of loading switch 90 in cascade-fashion, and a pull-up resistor 100 is coupled between the gate of the loading switch and the battery. The pull-up resistor ensures that the loading switch is turned on at the appropriate time by increasing the voltage level applied at the gate of the loading switch.

This type of level shifting may be required where the battery voltage is higher than the levels of the 3.3 or 5.0 volt control signal used to control switch 92. Without level shifting (i.e., without level-shifting switch 92 and pull-up resistor 100), the voltage at the gate of FET 98 would never exceed the level of the control signals. In the case of a battery voltage higher than the control signals, loading switch 90 could accidentally turn on, absent the level shifting arrangement.

As indicated above, firmware 22 may be configured to control battery management system 60 and perform various processing operations. For example, firmware may be configured to measure battery voltages at appropriate times by activating sample switch 62. During the sampling process, reference load 94 may or may not be applied to the battery to employ the reference-loading feature described above. For low load measurements (e.g., the simulated short circuit measurement used for chemistry identification), reference load 94 typically is not applied to the battery. In situations requiring high load battery measurements, it will often be desirable to use the reference load. When the reference load is used, other systems of the electronic device are often disabled to maximally isolate the reference load. In addition to the charging logic discussed above with reference to FIG. 1, firmware 22 typically disables charging during chemistry identification, battery sampling, fuel gauging and the other monitoring functions discussed herein.

Figure 4:
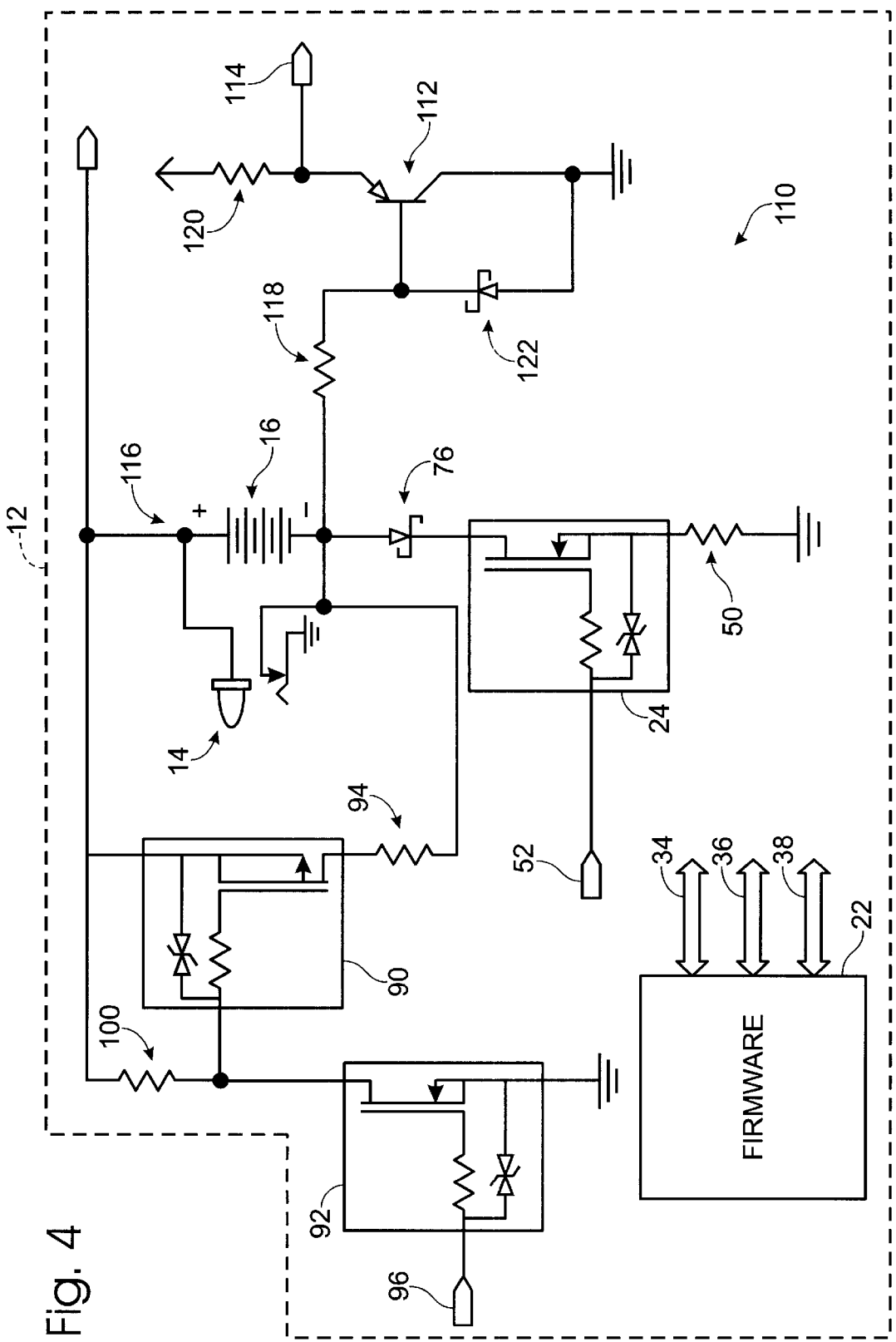
FIG. 4 is a schematic depiction of yet another battery management system according to the present invention.

FIG. 4 depicts another embodiment 110 of a battery management system according to the present invention. Though the depicted system is similar in many respects to the system of FIG. 3, it does not employ sample-and-hold monitoring of battery 16. Instead, fuel gauging and chemistry identification is performed with a bi-polar junction transistor 112 coupled to the low side of battery 16. Transistor 112 is configured as an emitter-follower with a gain of 1. Thus when AC adapter 14 is coupled to the system, the voltage of the ground-disconnected negative battery terminal may be read out at the emitter terminal via line 114. Firmware 22 determines battery voltage by measuring the difference between this voltage and the voltage at node 116 (the high side of the battery). Resistors 118 and 120 and diode 122 bias the transistor and prevent reverse currents from flowing.

From the above, it should be further appreciated that the invention also includes a battery-charging method. FIG. 5 depicts such a method, for use in connection with electronic devices capable of running on AC power, rechargeable batteries or non-rechargeable batteries. The method includes, at 130, providing a switchable charging circuit configured to selectively apply charging current to a battery coupled to an electronic device. The switchable charging circuit may be configured with the various features described above with reference to FIG. 1. At 132, the method includes determining whether the battery is rechargeable. This may include the various chemistry identification and voltage measurement techniques described above, with reference to FIGS. 1, 3 and 4. At 134, 136 and 138, the method includes implementation of the charging logic described above in connection with FIG. 1.

Specifically, charging may be disabled if it is determined that the battery is a non-rechargeable type (134), if the battery is fully charged (136), or if monitoring of the battery reveals damage (138).

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A battery management system for an electronic device configured to be powered by either an AC-DC converted power source, or a battery, the battery management system comprising:

a battery connector configured to couple the battery to the electronic device so that the battery provides power to the electronic device when the electronic device is not coupled with the AC-DC converted power source;

an AC adapter connector configured to couple the AC-DC converted power source to the electronic device so that the AC-DC converted power source powers the electronic device;

firmware coupled to the battery connector, including a chemistry identifier configured to determine whether the battery is rechargeable: and a charge switch coupled with and controlled by the firmware, where, when the electronic device is coupled to the battery and the AC-DC converted power source, activating the charge switch causes a charging current sourced by the AC-DC converted power source to be applied to the battery, where the firmware and charge switch prevent application of the charging current to the battery when the firmware determines that the battery is not rechargeable.

2. The battery management system of claim 1, where the charge switch prevents application of the charging current to the battery when the firmware determines that the battery is fully charged.

3. The battery management system of claim 1, where the charge switch prevents application of the charging current to the battery when the firmware determines that the battery is damaged.

4. The battery management system of claim 1, where the firmware is configured to read terminal voltage of the battery when the battery is subjected to a relative high load, and when the battery is subjected to a relative low load, for purposes of determining whether the battery is rechargeable.

5. The battery management system of claim 4, where the relative high load and low load voltage readings form a ratio, the firmware being configured to compare this ratio to known values for various battery types in order to determine whether the battery is rechargeable.

6. The battery management system of claim 1, further comprising a passive voltage sampler selectively coupled to the battery via a sampling switch, where activating the sampling switch causes the passive voltage sampler to sample and store terminal voltage of the battery.

7. The battery management system of claim 6, where the passive voltage sampler includes a capacitor that is charged by the battery upon activation of the sampling switch.

8. The battery management system of claim 6, where the firmware and passive voltage sampler are configured to sample battery terminal voltage when the electronic device is in a low load state, and where sampled voltage is subsequently read out and processed by the firmware.

9. The battery management system of claim 1, further comprising a loading switch configured to selectively couple a reference load to the battery.

10. The battery management system of claim 9, where the firmware is configured to control application of the reference load to the battery to facilitate determining whether the battery is rechargeable.

11. The battery management system of claim 1, where the charge switch is configured so that, even when the charge switch is activated, the charge switch automatically turns off when the charging current exceeds a predetermined maximum amount.

12. The battery management system of claim 1, where the charge switch is configured so that, even when the charge switch is activated, the charge switch automatically turns off when battery terminal voltage is less than a minimum threshold, the threshold being selected to inhibit charging of damaged or overly discharged batteries.

13. The battery management system of claim 1, where the battery management system is configured so that coupling the AC-DC converted power source to the electronic device reconfigures a terminal connection of the battery connector so that the battery is within a switchable charge path which is electrically parallel to the AC-DC converted power source.

14. A battery charging method for use in connection with an electronic device that can be powered by rechargeable batteries, non-rechargeable batteries or an AC-DC converted power source, the method comprising:

providing a charging circuit configured to enable selective application of a charging current generated by the AC-DC converted power source to a battery coupled to the electronic device;

coupling the AC-DC converted power source to the electronic device so that the AC-DC converted power source powers the electronic device while simultaneously charging the battery upon activation of the charging circuit;

determining whether the battery is rechargeable; and preventing application of the charging current to the battery if it is determined that the battery is not rechargeable.

15. The method of claim 14, where determining whether the battery is rechargeable includes measuring terminal voltage when the battery is subjected to a relative high load, and when the battery is subjected to a relative low load.

16. The method of claim 15, where high load and low load measurements are used to form a ratio, which is compared to known values for various battery types to determine whether the battery is rechargeable.

17. The method of claim 15, where measuring terminal voltage when the battery is subjected to a relative low load includes:

providing a passive voltage sampler selectively coupled to the battery by a sampling switch; and activating the sampling switch to cause the passive voltage sampler to sample and store battery terminal voltage.

18. The method of claim 17, where a capacitor is used to sample and store battery terminal voltage.

19. The method of claim 14, further comprising preventing application of charging current to the battery if it is determined that the battery is fully charged.

20. The method of claim 11, further comprising preventing application of charging current to the battery if it is determined that the battery is damaged.

21. A battery charging system for an electronic device capable of running on battery power or on power from a DC-converted AC source, the charging system comprising:

an AC adapter;

a battery connector having terminal leads configured to couple a battery to the electronic device; and a switchable charging circuit coupled to the battery connector and AC-DC adapter, the switchable charging circuit being configured to determine whether the battery is rechargeable and, in response, control application of a charging current from the AC adapter to the terminal leads, the charging circuit being further configured to cut off the charging current if the charging current exceeds a maximum threshold amount.

* * * * *

UNITED STATES PATENT AND TRADEMARK OFFICE
CERTIFICATE OF CORRECTION

PATENT NO. : 6,479,962 B2 Page 1 of 1
DATED : November 12, 2002
INVENTOR(S) : Ted B. Ziemkowski et al.

It is certified that error appears in the above-identified patent and that said Letters Patent is hereby corrected as shown below:

<u>Column 9,</u>
Line 38, after "rechargeable" delete ":" and insert therefor -- ; --

Signed and Sealed this

Thirteenth Day of July, 2004

JON W. DUDAS
*Acting Director of the United States Patent and Trademark Office*